(12) United States Patent
Sasamoto et al.

(10) Patent No.: US 6,239,940 B1
(45) Date of Patent: May 29, 2001

(54) DISK DEVICE AND DISK DEVICE CALIBRATING METHOD

(75) Inventors: Tatsuro Sasamoto; Tatsuhiko Kosugi; Kazunori Mori; Susumu Yoshida, all of Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 08/982,868

(22) Filed: Dec. 2, 1997

(30) Foreign Application Priority Data

May 12, 1997 (JP) .................................................... 9-121000

(51) Int. Cl.[7] .................................................... G11B 5/55
(52) U.S. Cl. ............................................................ 360/78.09
(58) Field of Search ............................ 360/78.09, 77.04, 360/78.04, 78.06, 78.07

(56) References Cited

U.S. PATENT DOCUMENTS

| | | |
|---|---|---|
| 5,146,374 | 9/1992 | Sakurai . |
| 5,285,330 | 2/1994 | Masaki . |
| 5,585,976 * | 12/1996 | Pham ............................. 360/78.09 X |
| 5,859,742 * | 1/1999 | Takaishi ....................... 360/78.09 X |
| 5,886,846 * | 3/1999 | Pham et al. ....................... 360/78.04 |
| 5,936,792 * | 8/1999 | Kobayashi et al. ............... 360/78.07 |

FOREIGN PATENT DOCUMENTS

| | | |
|---|---|---|
| 58-194174 * | 11/1983 | (JP) . |
| 58-194175 | 11/1983 | (JP) . |
| 64-4893 | 1/1989 | (JP) . |
| 3-58357 | 3/1991 | (JP) . |
| 3134882 | 6/1991 | (JP) . |
| 3-237667 | 10/1991 | (JP) . |
| 6-187044 * | 7/1994 | (JP) . |
| 7271446 | 10/1995 | (JP) . |

* cited by examiner

Primary Examiner—David Hudspeth
Assistant Examiner—James L Habermehl
(74) Attorney, Agent, or Firm—Greer, Burns & Crain, Ltd.

(57) ABSTRACT

A disk device performs feedforward servo control for moving a head to a target track. The disk device includes a calibrating portion for updating feedforward information, for moving the head, into information dedicated to the specific disk device; and a feedforward information storing portion for storing the feedforward information.

23 Claims, 9 Drawing Sheets

FEEDFORWARD
INFORMATION

ACCELERATING DECELERATING
SECTION       SECTION

FIG. 3B

POSITION
INFORMATION

FIG. 3C

DEMODULATED
POSITION

FIG. 3D

TARGET
POSITION

FIG. 3E

FEEDBACK
ERROR

UPPER LIMIT

LOWER LIMIT

FIG. 7A FEEDFORWARD INFORMATION

FIG. 7B SPEED INFORMATION

FIG. 7C DEMODULATED SPEED

FIG. 7D TARGET SPEED

FIG. 7E FEEDBACK ERROR

FIG. 7F POSITION INFORMATION

FIG. 7G DEMODULATED POSITION

FIG. 7H TARGET POSITION

FIG. 8

| ADDRESS | PARAMETER | |
|---|---|---|
| | 1  TRACK SEEK |  |
| | 2  TRACK SEEK |  |
| | 3  TRACK SEEK |  |
| ┆ | ┆ ┆ | ┆ |

FIG. 9

DISK DEVICE AND DISK DEVICE CALIBRATING METHOD

BACKGROUND OF THE PRESENT INVENTION

1. Field of the Invention

The present invention relates to a disk device and a disk device calibrating method for performing stable high-speed movement by a feedforward servo control for movement of a head to a target track.

Recently, advances have been made in making the capacity a disk device larger and increasing the speed of the disk device, and making of a servo technique for moving a head at a higher speed is required. However, in a servo technique which moves a head, only by feedback control, delay of a driving signal is large so that the delay of the driving signal cannot be ignored with respect to a seeking time, and thereby, high-speed movement cannot be achieved. (In the feedback control, the head is driven using a feedback error between target information for moving the head to a target position and demodulated information which is obtained as a result of demodulating feedback information from the head.) Therefore, a feedforward control has been used in general, in which a current waveform which moves the head is previously stored as feedforward information, which is added to the feedback error, and the head is controlled thereby.

2. Description of the Related Art

With reference the following figures, a disk device in the related art will now be described.

Figure 1:
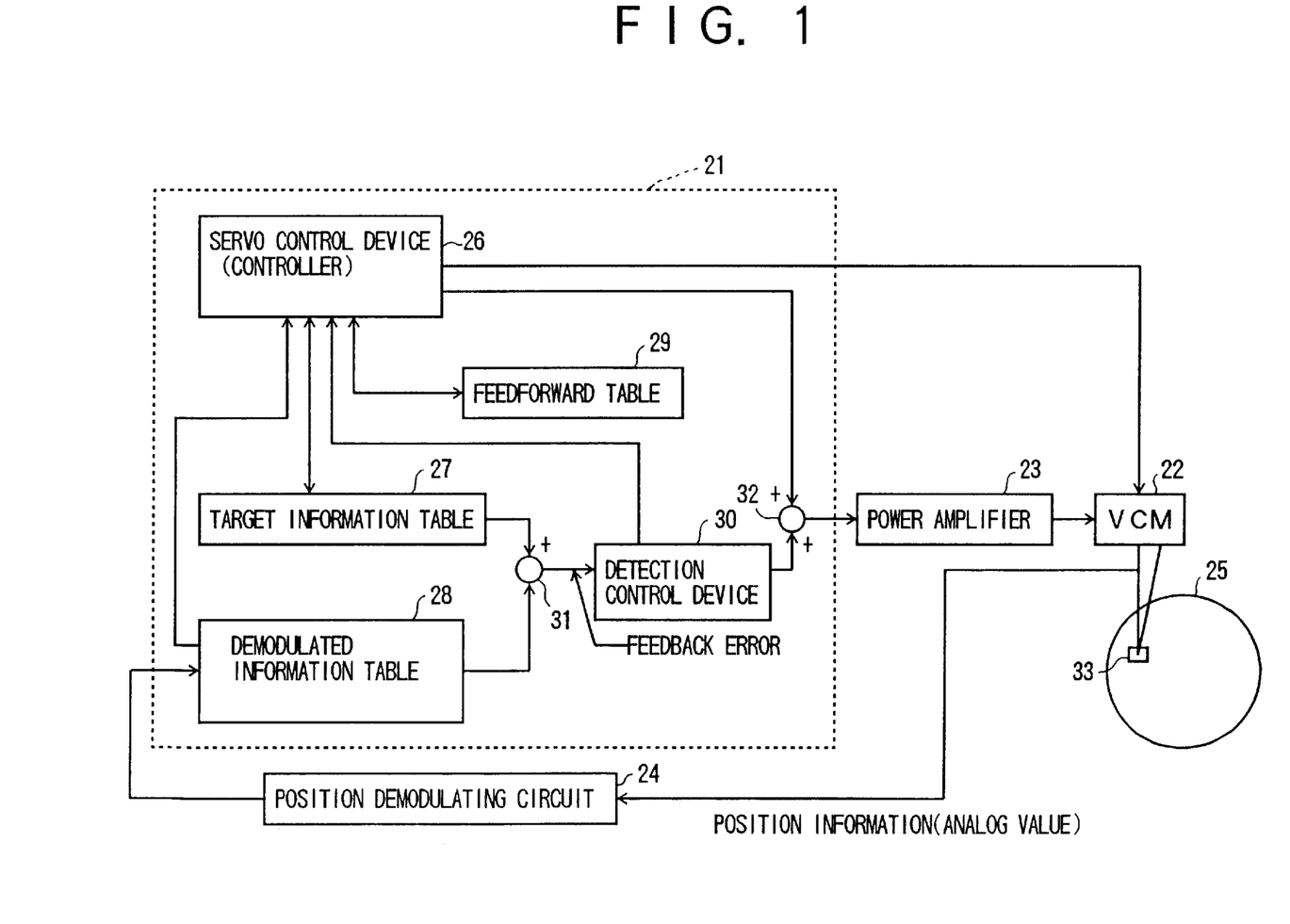
FIG. 1 shows an arrangement of a disk device in the related art.

FIG. 1 shows an example of an arrangement of the disk device in the related art, in which feedforward servo control is performed.

As shown in FIG. 1, the disk device includes servo control circuit 21, VCM (Voice Control Motor) 22, a power amplifier 23 and a position demodulating circuit 24. The servo control circuit 21 performs servo control for moving a head 33 to a target track on a disk 25. The VCM 22 moves the head 33 to a target position. The power amplifier 23 drives the VCM 22 using a driving current which is output from the servo control circuit 21. The position demodulating circuit 24 converts position information which is provided from the head 33 in a feedback manner into a digital signal.

Further, the servo control circuit 21 includes a servo control device 26, a target information table 27, a demodulated information table 28, a feedforward table 29, a detection control device 30, a comparator 31 and an adder 32. The servo control circuit 21 has a function of performing the servo control for desired movement of the head 33. The servo control device 26 controls a series of sequences of the servo control for moving the head 33 to a target track on the disk 25. The target information table 27 stores target information. The demodulated information table 28 stores demodulated information. The feedforward table 29 stores feedforward information which is common for all the disk devices. The detection control device 30 acts as a detection control unit. The comparator 31 compares the target information and the demodulated information with one another and sends a feedback error to the detection control device 30. The adder 32 adds the feedforward information and the feedback error to one another and drives the power amplifier 23.

In the above-described arrangement, when a user of the disk device performs an operation for reading data stored in the disk 25, the servo control device 26, which receives a reading instruction from the outside or externally, performs the servo control for movement of the head 33. This operation will be described with reference to an operation flowchart shown in FIG. 2.

Figure 2:
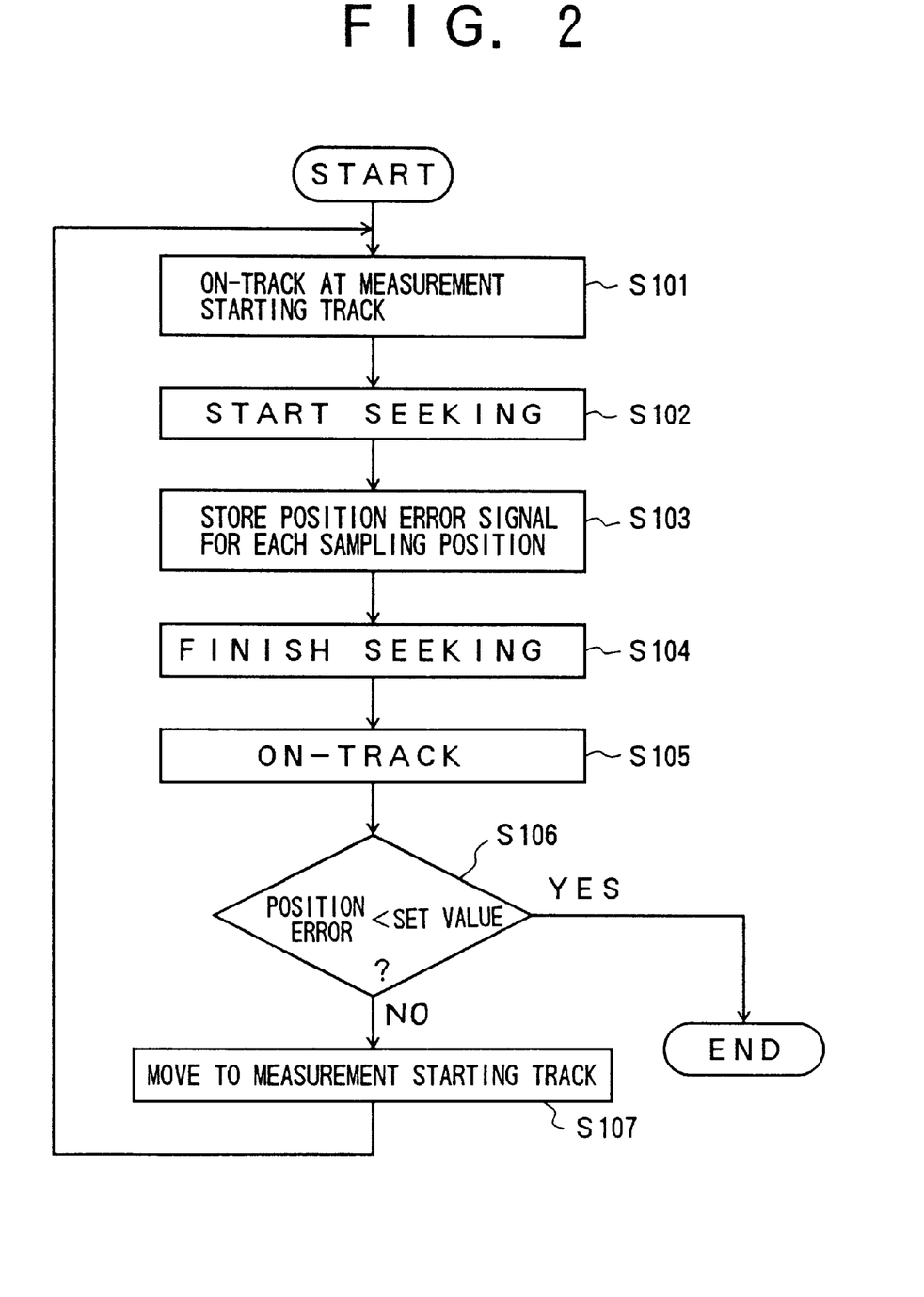
FIG. 2 shows an operation flowchart in the related art.

The VCM 22 moves the head 33 to a measurement starting track which corresponds to an initial value of position measurement in accordance with the instruction of the servo control device 26 (in a step S101).

Figure 3A:
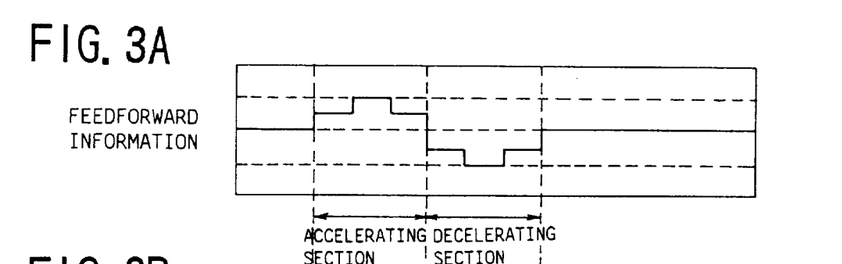
FIGS. 3A, 3B, 3C, 3D and 3E show waveforms used when a head seeks a track.

The servo control device 26 reads a parameter for moving the head 33, for example, such as that shown in FIG. 3A, from the feedforward table 29, and supplies a current to the power amplifier 23, which current corresponds to the parameter. The power amplifier 23, having the current supplied thereto, drives the VCM 22. As a result of being driven by the VCM 22, the head 33 starts seeking for the specified number of tracks (in a step S102). The above-mentioned parameter of the feedforward table 29 is previously set.

Figure 3B:
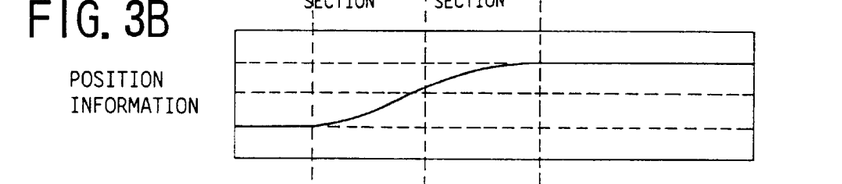
Figure 3C:
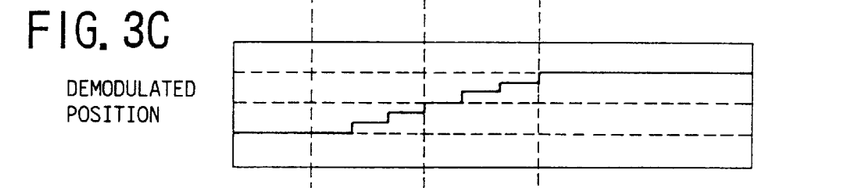

The head 33 sends position information from seek start (in a step S102) to seek end (in a step S104) in analog values, such as that shown in FIG. 3B, to the position demodulating circuit 24. The position demodulating circuit 24, receiving the position information, converts the analog signal to a digital signal at each sampling position, and sends demodulated position information, for example, such as that shown in FIG. 8C, to the demodulated information table 28. The information demodulated table 28 stores the information (in a step S103). The head 33 finishes the seeking (in the step S104), and enters an on-track condition at the target position (in a step S105).

Figure 3D:
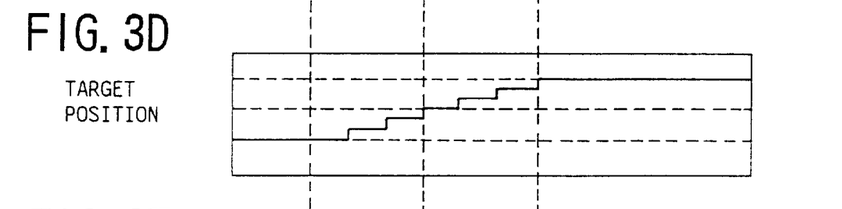
Figure 3E:
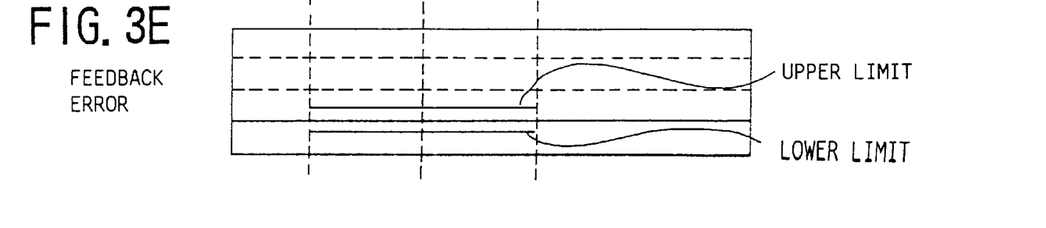

The comparator 31 obtains the difference between the demodulated position information stored in the demodulated information table 28 and the target position information previously stored in the target information table 27, for example, such as that shown in FIG. 3D. Then, the comparator 31 sends the feedback error, for example, such as that shown in FIG. 8E, to the detection control device 30. The detection control device 30, receiving the feedback error, determines, based on a predetermined determination reference range, whether the feedback error is within the range (in the step S106).

When the feedback error is within the predetermined range (Yes in the step S106), the detection control device 30 informs the servo control device 26 that the head 33 has moved to the target position. Thus, the user of the disk device can cause the disk device to read the data recorded on the disk 25.

When the feedback error is out of the predetermined range (No in the step S106), the detection control device 30 informs the servo control device 26 that the head 33 has not moved to the target position. The servo control device 26, receiving the information, instructs the VCM 22 to move the head 33 to the measurement starting track which corresponds to the initial value of the position measurement (in a step S107). Then, the servo control device 26 again reads, from the feedforward table 29, the parameter for moving the head 33, and supplies, to the adder 32, the current value corresponding to the parameter. The adder 32 adds the feedback error to the current value, and supplies the addition result to the power amplifier 23. The power amplifier 23, having the current supplied thereto, drives the VCM 22, and the head 33 again starts seeking as a result of being driven by the VCM 22.

The servo control circuit 21 repeats the operation from the step S101 to the step S107 until the feedback error becomes within the predetermined range.

If the disk device is ideal, the head 33 can move to the target track only with the feedforward information.

However, in an actual operation, because the performance of each component varies among disk devices, it is not possible to provide an accurate movement of the head 33 in a condition where the feedforward information is fixed among all the disk devices. In the servo control, the feedback error between the target position information and the demodulated position information is added to the feedforward information, and head movement is performed also using the feedback control. Thereby, delay occurs due to the feedback loop, and high-speed seeking cannot be achieved.

Further, as the track density increases, the determination reference range for determining whether the head has reached a target accurately becomes narrower. However, in the related art, the feedforward information in a stage of simulation or debug of the disk device is commonly stored in a ROM or the like for all the disk devices. Therefore, a position error, occurring when the head has moved only in accordance with the feedforward information, cannot be corrected by using the feedback control. Thus, it is difficult to perform stable servo control. Further, due to the same reason, a margin for externally applied shake or shock, or variation of performances of components among disk devices is reduced.

SUMMARY OF THE INVENTION

An object of the present invention is to stably perform high-speed movement of the servo control by feedforward, as a result of rewriting the feedforward information for moving the head, into feedforward information dedicated to each specific disk device.

In order to achieve the above-mentioned object, in a disk device according to the present invention which performs feedforward servo control for moving a head to a target track, a calibrating unit for updating feedforward information, for moving the head, into information dedicated to the specific disk device; and a feedforward information storing unit for storing the feedforward information are provided.

Further, in a disk device calibrating method according to the present invention, the disk device performing feedforward servo control for moving a head to a target track, the steps of a) updating feedforward information, for moving the head, into information dedicated to the specific disk device; and b) storing the feedforward information in a feedforward information storing unit are performed.

When the above-described calibrating method is performed in the above-described disk device, in actual reading and writing operations, if the performances of respective components vary, because the stored feedforward information is always the information dedicated to the specific disk device, the head can be accurately moved only with the feedforward information, the delay due to the feedback loop is reduced and it is possible to achieve high-speed seeking. Further, if the determination reference range for determining whether the head has reached a target accurately becomes narrower as the track density increases, because the precise feedforward information can be obtained, stable servo control can be performed against externally applied shake or shock, or variation of performances of components among disk devices.

In the components of the disk device, the performance of some components may change due to operating time and/or operating environment. As the performances of components change, the optimum value of the feedforward information changes. In order to have the latest information dedicated to the specific disk device, the disk device according to the present invention can update the feedforward information into the latest information dedicated and optimum to the specific disk device in at least one of the following occasions: before the disk device is shipped; when power is first supplied to the disk device after the shipment; when a seek error occurs; when the number of seek errors reaches a predetermined number of seek error occurrences; and periodic timing given by an internal clock of the disk device.

In the above-described disk device, even if the performances of the respective components change, the feedforward information is always the latest information dedicated to the specific disk device.

In order to store the precise feedforward information, according to the present invention, a determining unit is provided, the determining unit determining whether or not the head has reached a target position based on a predetermined determination reference range, when the feedforward information is updated.

Further, in the disk device calibrating method, the step of c) determining whether or not the head has reached a target position based on a predetermined determination reference range is performed when the feedforward information is updated.

When the above-described calibrating method is performed in the above-described disk device, and when the updating of the feedforward information is repeated as the determination reference range gradually becomes narrower, more precise feedback information can be obtained.

Further, in the disk device, updating of the feedforward information is performed for a plurality of positions along a radial direction of the disk, and rewriting the stored contents of the feedforward information storing unit if necessary.

Further, in the disk device calibrating method, updating of the feedforward information is performed for a plurality of positions along a radial direction of the disk, and rewriting the stored contents of the feedforward information storing unit is performed if necessary.

When the above-described calibrating method is performed in the above-described disk device, the feedforward information for various positions can be obtained. As a result, more precise servo control c an be performed.

Further, in the disk device, updating of the feedforward information is performed for head inner direction movement and head outer direction movement, separately, and rewriting the stored contents of the feedforward information storing unit is performed if necessary.

Further in the disk device calibrating method, updating of the feedforward information is performed for head inner direction movement and head outer direction movement, separately, and rewriting the stored contents of the feedforward information storing unit is performed if necessary.

When the above-described calibrating method is performed in the above-described disk device, the feedforward information for inner and outer head moving directions can be obtained. As a result, more precise servo control can be performed.

Further, in the disk device, updating of the feedforward information is performed for each amount of head movement distance, and rewriting the stored contents of the feedforward information storing unit is performed if necessary.

Further, in the disk device calibrating method, updating of the feedforward information is performed for each amount of head movement distance, and rewriting the stored contents of the feedforward information storing unit is performed if necessary.

When the above-described calibrating method is performed in the above-described disk device, the feedforward information for various head movement distances can be obtained. As a result, more precise servo control can be performed.

Further, in the disk device, each amount of head movement distance is a discrete value and, when the head is moved in accordance with an in-between value of the discrete values, the feedforward information for the in-between value is obtained as a result of interpolation of the feedforward information of the discrete values.

Further, in the disk device calibrating method, each amount of head movement distance is a discrete value and, when the head is moved for an in-between value of the discrete values, the feedforward information for the in-between value is obtained as a result of interpolation of the feedforward information of the discrete values.

When the above-described calibrating method is performed in the above-described disk device, the head can be moved with, in addition to the feedforward information for the various head movement distances, the feedforward information for in-between values of the various head movement distances. As a result, more precise servo control can be performed.

Further, in the disk device, updating of the feedforward information is performed for a plurality of positions along a radial direction for each amount of head movement distance, and average value of the thus-obtained feedforward information for each head movement distance is stored in the feedforward information storing unit.

Further, in the disk device calibrating method, updating of the feedforward information is performed for a plurality of positions along a radial direction for each amount of head movement distance, and average value of the thus-obtained feedforward information for each head movement distance is stored in the feedforward information storing unit.

When the above-described calibrating method is performed in the above-described disk device, more reliable feedforward information can be obtained for the various head movement distances.

Further, in the disk device, updating of target information including target speed information and target position information for moving the head to a target position is performed, after the updating of the feedforward information.

The disk device further comprises: a demodulated information storing unit for storing demodulated information including demodulated speed information and demodulated position information obtained from demodulating feedback information from the head; and a target information storing unit for storing the target information.

Further, in the disk device calibrating method, updating of the target information is performed, after the updating of the feedforward information.

When the above-described calibrating method is performed in the above-described disk device, more precise target information can be obtained.

Further, in the disk device, a demodulated information determining unit is provided, the demodulated information determining unit determining whether feedback error is within a predetermined determination reference range, the feedback error being obtained from comparing the demodulated information for a predetermined plurality of positions on a head moving path and the target information corresponding to the predetermined plurality of positions with one another.

Further, the disk device calibrating method comprises the step of determining whether feedback error is within a predetermined determination reference range, the feedback error being obtained from comparing the demodulated information for a predetermined plurality of positions on a head moving path and the target information corresponding to the predetermined plurality of positions with one another.

When the above-described calibrating method is performed in the above-described disk device, and when the updating of the target information is repeated as the determination reference range gradually becomes narrower, more precise target information can be obtained.

Further, in the disk device, a demodulated information determining unit is provided, the demodulated information determining unit determining whether the sum of the absolute values of feedback errors is within a predetermined determination reference range, the feedback errors being obtained from comparing the demodulated information for a predetermined plurality of positions on a head moving path and the target information corresponding to the predetermined plurality of positions with one another.

Further, the disk device calibrating method comprises the step of determining whether the sum of the absolute values of feedback errors is within a predetermined determination reference range, the feedback errors being obtained from comparing the demodulated information for a predetermined plurality of positions on a head moving path and the target information corresponding to the predetermined plurality of positions with one another.

When the above-described calibrating method is performed in the above-described disk device, and when the updating of the target information is repeated as the determination reference range gradually becomes narrower, more precise target information can be obtained.

Further, in the disk device, a demodulated information determining unit is provided, the demodulated information determining unit determining whether the sum of squares of feedback errors is within a predetermined determination reference range, the feedback errors being obtained from comparing the demodulated information for a predetermined plurality of positions on a head moving path and the target information corresponding to the predetermined plurality of positions with one another.

Further, the disk device calibrating method comprises the step of determining whether the sum of squares of feedback errors is within a predetermined determination reference range, the feedback errors being obtained from comparing the demodulated information for a predetermined plurality of positions on a head moving path and the target information corresponding to the predetermined plurality of positions with one another.

When the above-described calibrating method is performed in the above-described disk device, and when the updating of the target information is repeated as the determination reference range gradually becomes narrower, more precise target information can be obtained.

Other objects and further features of the present invention will become more apparent from the following detailed description when read in conjunction with the accompanying drawings.

DETAILED DESCRIPTION OF THE PREFERRED EMBODIMENT

With reference to figures, one embodiment of the present invention will now be described.

Figure 4:
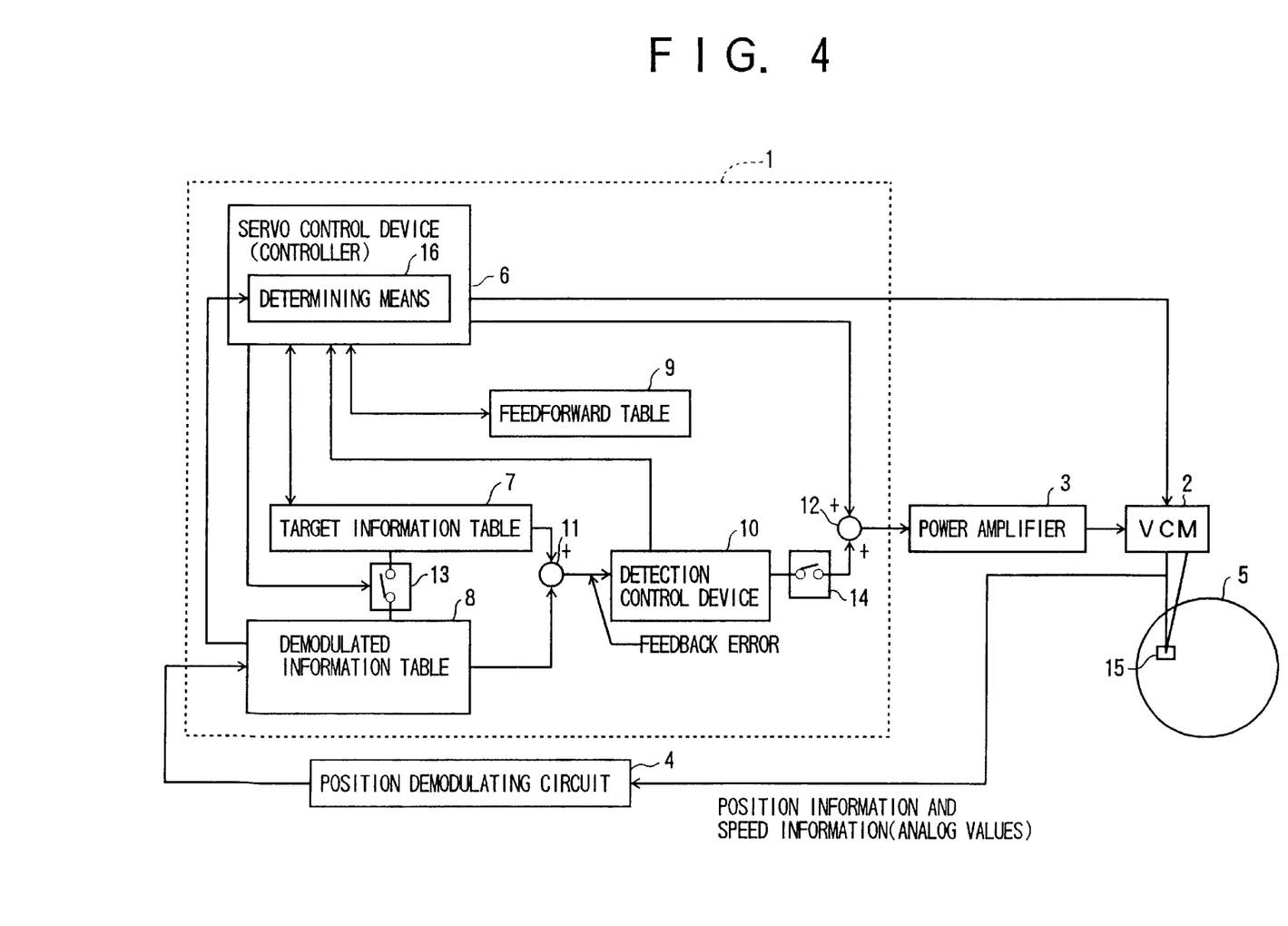
FIG. 4 shows an arrangement of one embodiment of the present invention.

FIG. 4 shows an arrangement of the embodiment of the present invention which updates the feedforward information and the target information.

In FIG. 4, a disk device includes a servo circuit 1, VCM (Voice Coil Motor) 2, a power amplifier 3 and a position demodulating circuit 4. The servo control circuit 1 performs servo control for moving a head 15 to a target track on a disk 5. The VCM 2 moves the head 15 to a target position. The power amplifier 3 drives the VCM 2 using a driving current which is output from the servo control circuit 1. The position demodulating circuit 4 converts position information which is provided from the head 15 in a feedback manner into a digital signal, and stores the digital signal in demodulated information table 8 in the servo control circuit 1.

Further the servo control circuit 1 includes a servo control device 6, a control target information table 7, the demodulated information table 8, a feedforward table 9, a detection control device 10, a comparator 11, an adder 12, a first switch 13 and a second switch 14. The servo control circuit 1 has a function of performing the servo control for desired movement of the head 15.

The servo control device 6 includes a determining means 16 which determines whether or not the head 15 has reached a target position. The servo control device 6 acts as a unit for calibrating the feedforward information. The servo control device 6 has a function of controlling a sequence of a series of calibrating steps (from a step S1 through a step 13 of FIG. 5 and from a step S21 through a step S30) including feedforward information storing steps (step S10 and S13 of FIG. 5, steps S24 and S30 of FIG. 6), determining steps (steps S5 and S6 of FIG. 5 and steps S21 and S22 of FIG. 6). The control target information table 7 acts as a target information storing unit, and has a function of previously storing target information such as target position information, target speed information and so forth, and also storing updated target information. The demodulated information table 8, acting as a demodulated information storing unit, has a function of storing demodulated information such as demodulated position information, demodulated speed information and so forth which has been converted into the digital signal by the position demodulating circuit 4. The demodulated information table 8 further has a function of sending the demodulated information such as the demodulated position information, the demodulated speed information and so forth to the control target information table 7 and the determining means 16. The feedforward table 9, acting as a feedforward information storing unit, has a function of previously storing feedforward information which is a parameter for moving the head 15. The feedforward table 9 further has a function of storing the latest feedforward information when the feedforward information is updated. The detection control device 10, acting as a demodulated information determining unit, determines whether or not the difference between the demodulated information stored in the demodulated information table 8 and the target information stored in the target information table 7 is within a predetermined range. The detection control device 10 further has a function of performing a demodulated information determining step (the step S106 in FIG. 2) for informing the determination result to the servo control device 6. The comparator 11 has a function of sending the feedback error, obtained from comparing the target information and the demodulated information with one another, to the detection control device 10. The adder 12, when the head 15 moves to the target position, adds the feedforward information and the feedback error to one another, and drives the power amplifier using the addition result. The first switch 13 is in its ON state only when the target information table is updated. The second switch 14 is in its OFF condition when the feedforward information is updated.

In the above-described arrangement, when a user of the disk device performs a feedforward updating operation, the servo control device 6 updates the previously stored feedforward information and target information into the optimum feedforward information and target information dedicated to the specific disk device. The optimum feedforward information is the feedforward information with which, when the feedforward information is updated, the determining mean s16 determines that the error of the demodulated information is within a determination reference range. The optimum target information is the target information, with which, when the target information is updated, the detection control device 10 determines that the feedback error is within a determination reference range. With reference to an operation flow shown in FIGS. 5 and 6, operations of updating the feedforward information and target information will be described.

Figure 5:
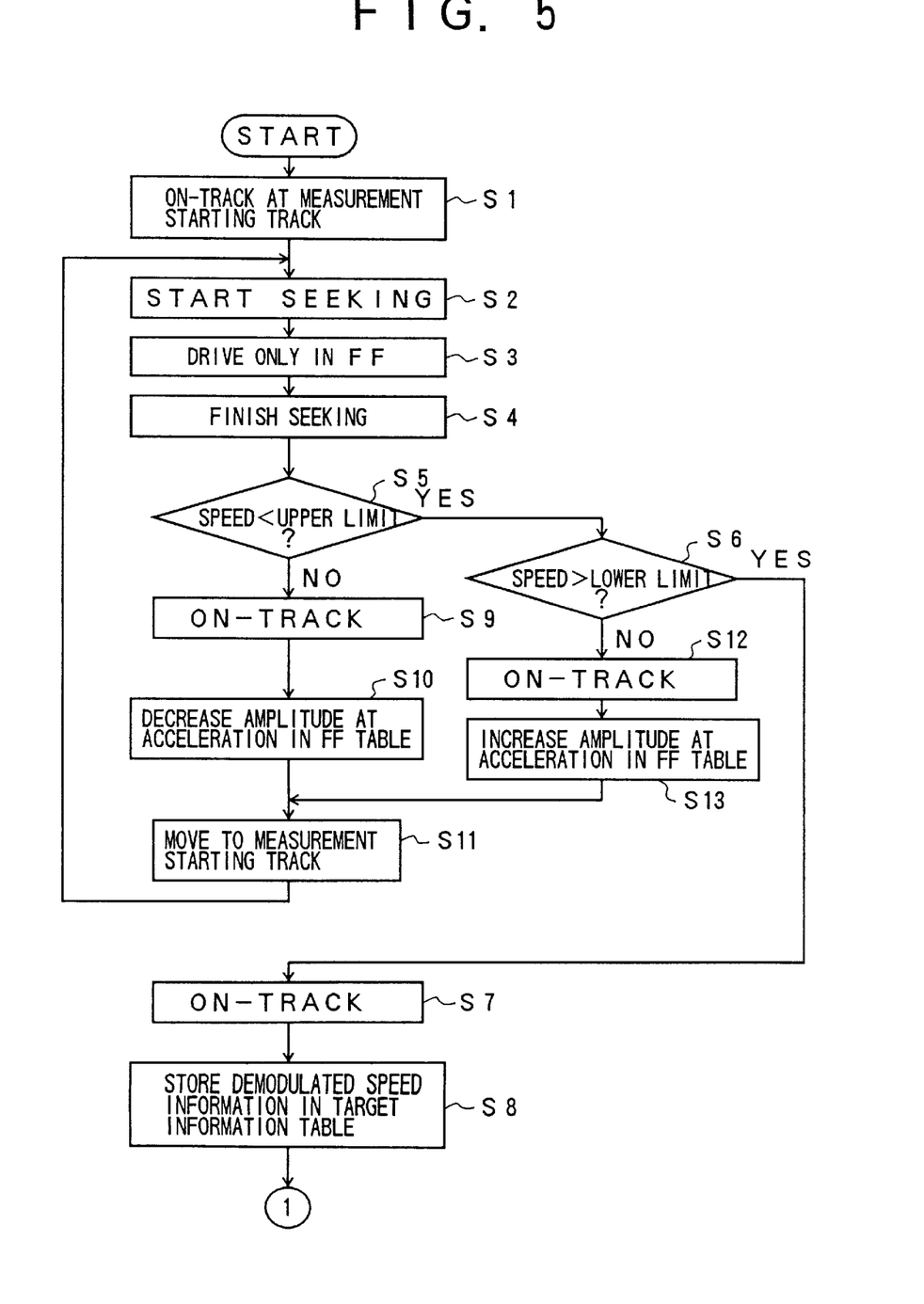
FIGS. 5 and 6 show an operation flowchart in the embodiment of the present invention.

Updating of the feedforward information, shown in FIG. 5, is an operation in a case where the target speed information stored in the target information table 7 is updated. By the servo control device 6, initial setting is performed so that each of the first and second switches 13 and 14 is in its OFF state.

The VCM 2 moves the head 15 to a measurement starting track which corresponds to an initial value of position measurement (in a step S1 of FIG. 5).

Figure 7A:
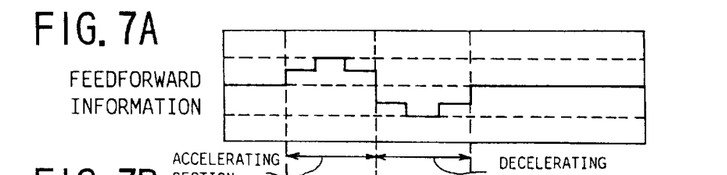
FIGS. 7A, 7B, 7C, 7D, 7E, 7F, 7G and 7H show waveforms used when updating feedforward information and target information in the present invention.
Figure 8:
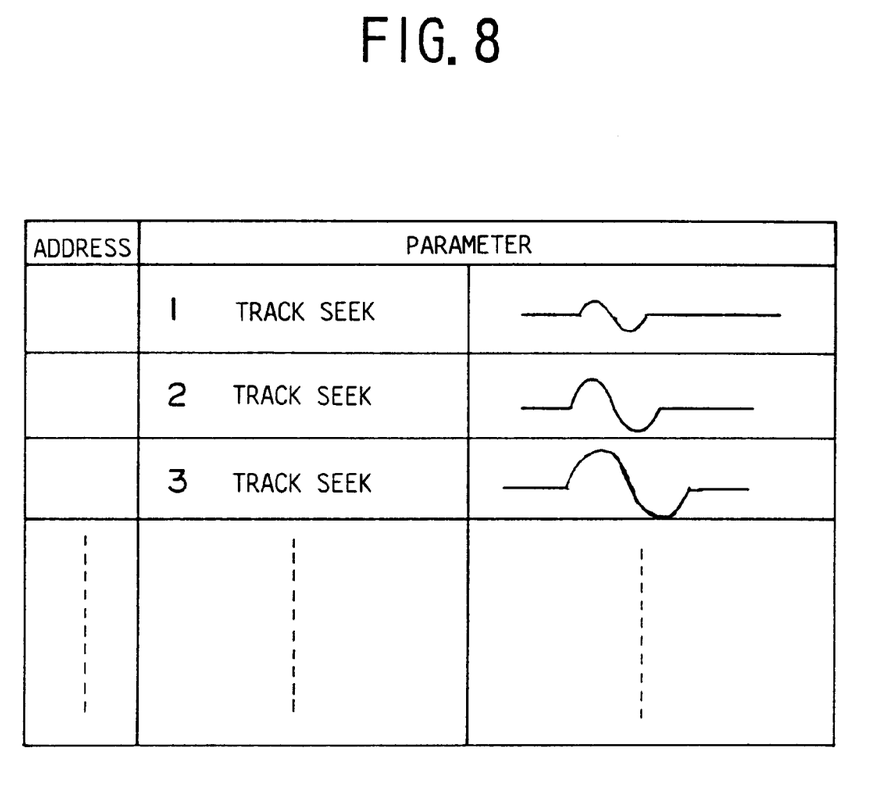
FIG. 8 shows an example of an arrangement of a feedforward table.

The servo control device 6 provides an address to the feedforward table 9, in which parameters, for example, such as those shown in FIG. 8 which shows an example of the feedforward table, are previously set. Thereby, the servo control device 6 specifies a parameter for moving the head 15, and thus, receives the parameter such as that shown in FIG. 7A from the feedforward table 9. Then, the servo control device 6 sends the current value corresponding to the parameter to the adder 12. The adder 12 supplies the current to the power amplifier 3, and the power amplifier 3, having the current supplied thereto, drives the VCM 2. As a result of being driven by the VCM 2, the head 15 starts seeking for the specified number of tracks (in a step S2).

Because the second switch 14 is in its OFF state, the adder 12 outputs the input values. Accordingly, the VCM 2 is driven only by the current corresponding to the parameter of feedforward table 9 (in a step S3).

Figure 7B:
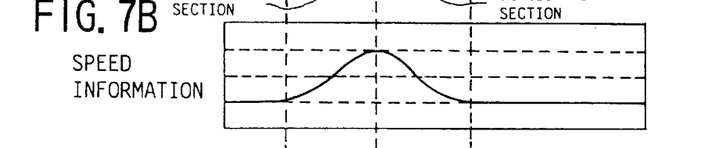

The head 15 sends, to the position demodulating circuit 4, speed information from the start of seeking (the step S2) through the end of seeking (in the step S4) in analog values, for example, such as those shown in FIG. 7B. Simultaneously, the head 15 sends position information to the position demodulating circuit 4 in analog values, for example, such as those shown in FIG. 7F. The position demodulating circuit 4, receiving the speed information and the position information, converts the analog signals into the digital signals at each predetermined sampling position. Thus, the position demodulating circuit 4 sends, to the demodulated information table 8, demodulated speed information, for example, such as that shown in FIG. 7C, and demodulated position information such as that shown in FIG. 7G. The demodulated information table 8 stores the sent information.

Figure 7C:
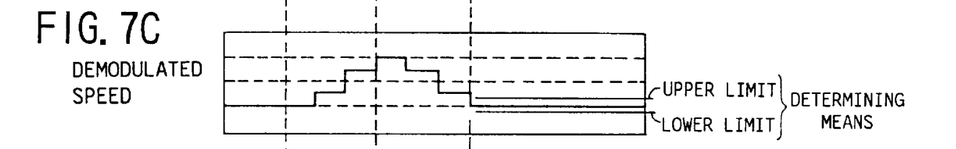

After the seek operation has finished (in the step S4), the determining means 16 of the servo control device 6 reads the demodulated speed information from the demodulated information table 8, and determines whether or not the head 15 has reached a target position accurately, based on, for example, the predetermined determination reference range shown in FIG. 7C (in steps S5 and S6).

When the speed indicated by the demodulated speed information is within the predetermined range (Yes in the step S5 and Yes in the step S6), the head enters the on-track condition (in a step S7). Then, the servo control device 6 causes the first switch 13 to be in the ON state. The demodulated information table 8 transfers the demodulated speed information stored therein to the target information table 7 which stores the transferred demodulated speed information as the target speed information (in a step S8). Then, the servo control device 6 causes the first switch 13 to be the OFF state. In this case, the servo control device 6 does not rewrite the feedforward information.

When the speed of the demodulated speed information exceeds the upper limit of the predetermined range (No in the step S5), the servo control device 6 recognizes that the head 15 has gone over the target position. Then, the servo control device 6 causes the head 15 to enter into the on-track condition (in the step S9). Then, the servo control device 6 updates the parameter of the feedforward information so that, for example, the amplitude in acceleration shown in FIG. 7A, of the feedforward table 9 is reduced (in a step S10). The VCM 2, in accordance with instructions from the servo control device 6, moves the head 15 to the measurement starting track corresponding to the initial value of position measurement (in a step S11).

The servo control device 6, having updated the feedforward information, supplies an address to the feedforward table 9, specifies the updated parameter and reads the parameter. The servo control device 6 sends the current value corresponding to the parameter to the adder 12. The adder 12 supplies the current to the power amplifier 3, and the power amplifier, having the current supplied thereto, drives the VCM 2. As a result of being driven by the VCM 2, the head 15 starts seeking (in the step S2). When the speed of the demodulated speed information still exceeds the upper limit of the predetermined range, the servo control device 6 repeats the operation of the above-mentioned steps from the step S2 through the step S5 and from the step S9 through the step S11 until the speed of the demodulated speed information does not exceed the upper limit of the predetermined range.

Further, when the speed of the demodulated speed information does not exceed the upper limit of the predetermined range (Yes in the step S5), but the speed of the demodulated speed information is lower than the lower limit of the predetermined range (No in the step 6), the servo control device 6 recognizes that the head 15 has not reached the target position. Then, the servo control device 6 causes the head 15 to enter the on-track condition (in the step S12). Then, the servo control device 6 updates the parameter of the feedforward information so that, for example, the amplitude in acceleration shown in FIG. 7A, of the feedforward table 9 is increased (in a step S13). The VCM 2, in accordance with instructions from the servo control device 6, moves the head 15 to the measurement starting track corresponding to the initial value of position measurement (in a step S11).

The servo control device 6, having updated the feedforward information, supplies an address to the feedforward table 9, specifies the updated parameter and reads the parameter. The servo control device 6 sends the current value corresponding to the parameter to the adder 12. The adder 12 supplies the current to the power amplifier 3, and the power amplifier, having the current supplied thereto, drives the VCM 2. As a result of being driven by the VCM 2, the head 15 starts seeking (in the step S2). When the speed of the demodulated speed information still is lower than the lower limit of the predetermined range, the servo control device 6 repeats the operation of the above-mentioned steps from the step S2 through the step S6 and from the step S9 through the step S13 until the speed of the demodulated speed information is not lower than the lower limit of the predetermined range and also does not increase the upper limit of the predetermined range.

Figure 6:
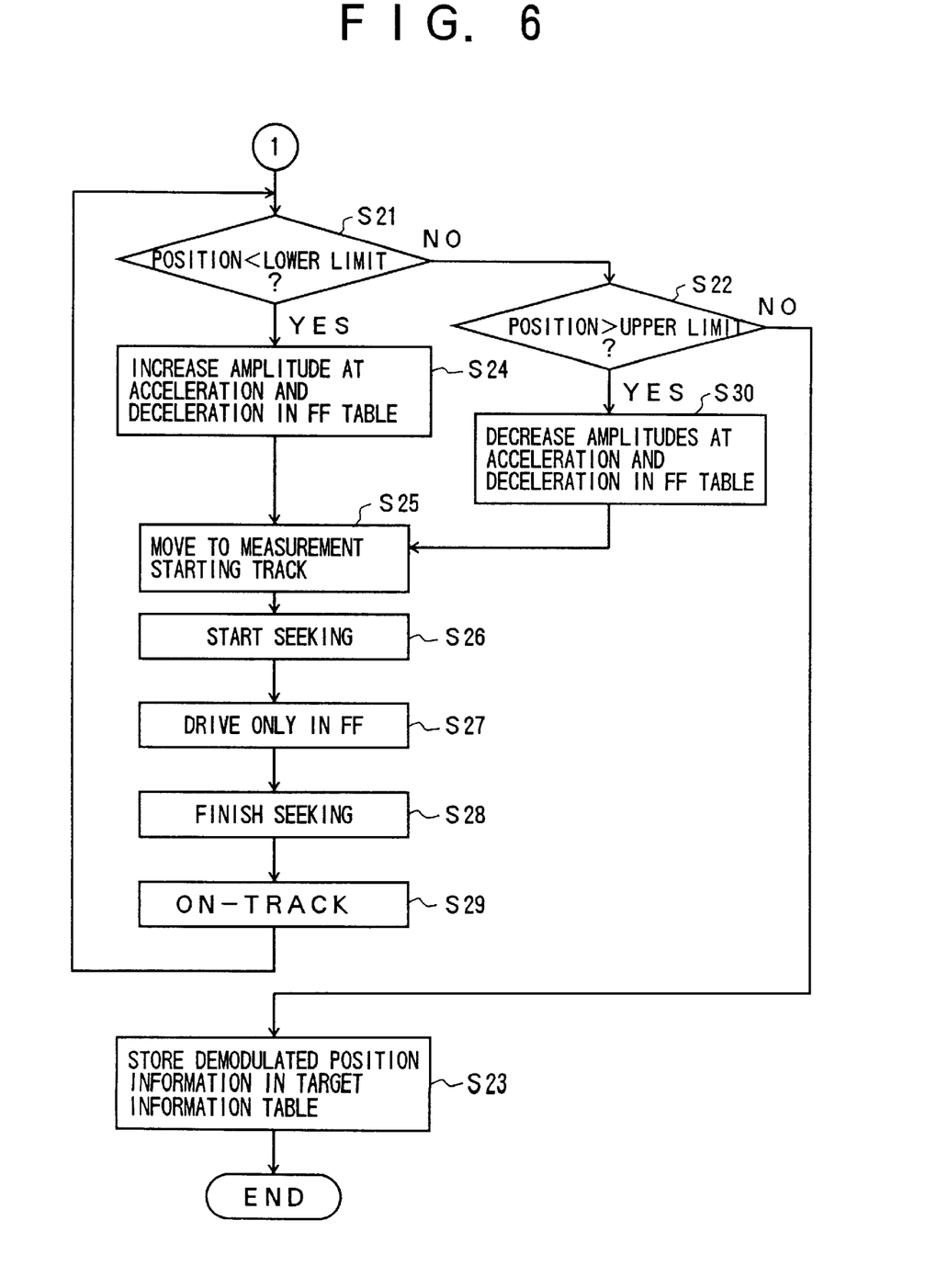

Updating the feedforward information, which will be described with reference to FIG. 6, is an operation in a case where the target position information stored in the target information table 7 is updated. The operation of FIG. 6 follows the operation of FIG. 5 ($\hat{1}$ of FIG. 5 is connected to $\hat{1}$ of FIG. 6).

After the head 15 enters into the on-track condition in the step S7 of FIG. 5, the determining means 16 of the servo control device 6 reads the demodulated position information which was previously (in the steps S2, S3 and S4 of FIG. 5) stored in the demodulated information table 8. Then, the determining means 16 determines whether or not the head 15 has accurately reached the target position based on a predetermined determination reference range such as, for example, that shown in FIG. 7G (in steps S21 and S22 of FIG. 6.

When the position indicated by the demodulated position information is within the predetermined range (Yes in the step S21 and Yes in the step S22), the servo control device 6 recognizes that the head 15 has reached the target position, and causes the first switch 13 to be in the ON state. The demodulated information table 8 transfers the demodulated position information stored therein to the target information table 7 which stores the transferred demodulated position information as the target position information (in a step S23). Then, the servo control device 6 causes the first switch 13 to be the OFF state. In this case, the servo control device 6 does not rewrite the feedforward information.

When the position of the demodulated position information is lower than the lower limit of the predetermined range (No in the step S21), the servo control device 6 recognizes that the head 15 has not reached the target position. Then, the servo control device 6 updates the parameter of the feedforward information so that, for example, the amplitudes in acceleration and deceleration shown in FIG. 7A, of the feedforward table 9 are increased (in a step S24). The VCM 2, in accordance with instructions from the servo control device 6, moves the head 15 to the measurement starting track corresponding to the initial value of position measurement (in a step S25).

The servo control device 6, having updated the feedforward information, supplies an address to the feedforward table 9, specifies the updated parameter and reads the parameter. The servo control device 6 sends the current value corresponding to the parameter to the adder 12. The adder 12 supplies the current to the power amplifier 3, and the power amplifier, having the current supplied thereto, drives the VCM 2. As a result of being driven by the VCM 2, the head 15 starts seeking (in the step S26).

Because the second switch 14 is in its OFF state, the adder 12 outputs the input values. Accordingly, the VCM 2 is driven only by the current corresponding to the parameter of feedforward table 9 (in a step S27).

The head 15 sends, to the position demodulating circuit 4, the position information from the seeking start (in the step S26) through the seeking end (in the step S28) in analog values. The position demodulating circuit 4, receiving the position information, converts the analog signals into the digital signals at each predetermined sampling position. Thus, the position demodulating circuit 4 sends, to the demodulated information table 8, demodulated position information. The demodulated information table 8 stores the sent information. After the seeking end (in the step S28), the head 15 enters into the on-track condition (in a step S29). When the position of the demodulated position information is still lower than the lower limit of the predetermined range, the servo control device 6 repeats the operation of the above-mentioned steps of the step S21 and from the step S24 through the step S29 until the position of the demodulated speed information is not lower than the lower limit of the predetermined range.

Further, when the position of the demodulated position information is not lower than the lower limit of the predetermined range (Yes in the step S21), but the position of the demodulated position information exceeds the upper limit of the predetermined range (No in the step 22), the servo control device 6 recognizes that the head 15 has gone over the target position. Then, the servo control device 6 updates the parameter of the feedforward information so that, for example, the amplitudes in acceleration and deceleration shown in FIG. 7A, of the feedforward table 9 is reduced (in a step S30). The VCM 2, in accordance with instructions from the servo control device 6, moves the head 15 to the measurement starting track corresponding to the initial value of position measurement (in the step S25). When the position of the demodulated position information still exceeds the upper limit of the predetermined range, the servo control device 6 repeats the operation of the above-mentioned steps S21, S22, from the step S24 through the step S30 until the position of the demodulated position information does not exceeds the upper limit of the predetermined range and also is not lower than the lower limit of the predetermined range.

Figure 9:
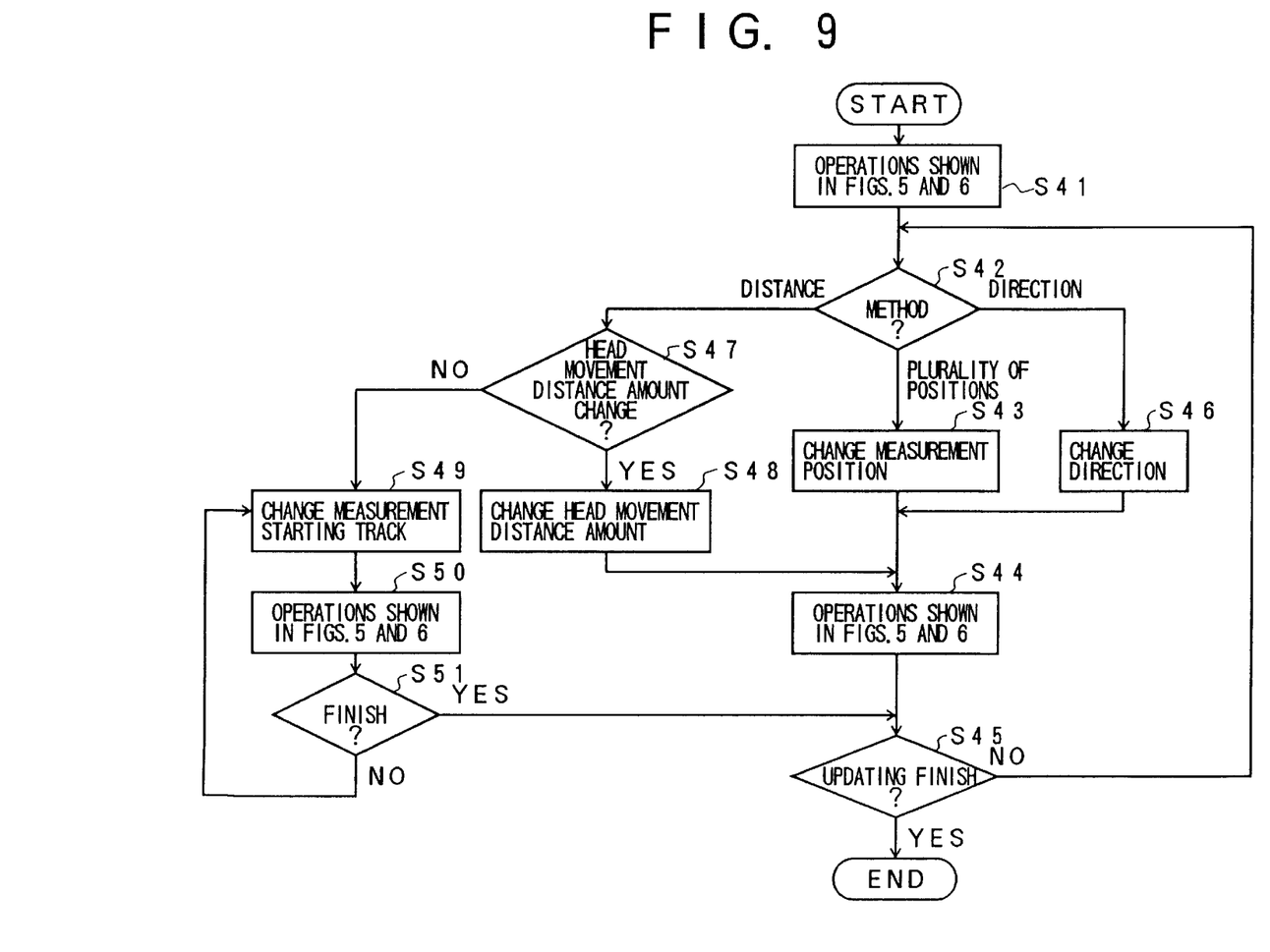
FIG. 9 shows a flowchart of a method for obtaining different feedforward information.

The servo control device 6, which has obtained the one optimum feedforward information in accordance with the operations shown in FIGS. 5 and 6, can further obtain various feedforward information, for example, in the method shown in FIG. 9.

With reference to FIG. 9, in a step S41, the servo control device 6 has obtained the one optimum feedforward information. Then, the servo control device 6 selects an operation of obtaining various feedforward information from among performing the operation for a plurality of positions along a radial direction of the disk, performing the operation for movement of the head in the disk inner direction and disk outer direction separately, and performing the operation for each head movement distance amount (in a step S41).

When the operation is performed for a plurality of positions along a radial direction of the disk ('plurality of positions' of the step S42), the servo control device 6 changes the feedforward information measuring position (in a step S43). Then, the servo control device 6 performs the operations shown in FIGS. 5 and 6 (in a step S44). Then, the servo control device 6 determines (in a step S45) whether or not updating of the feedforward information for predetermined measuring positions has been finished. When it has been finished (Yes of the step S45), the servo control device 6 completes the feedforward updating operation shown in FIG. 9. When it has not been finished (No of the step S45), the servo control device 6 repeats the operations of the steps from the step 42 through the step 45 until updating of the feedforward information for the predetermined measuring positions has been finished (Yes of the step S45).

When the operation is performed for movement of the head in the disk inner direction and disk outer direction separately ('direction' in the step S42), if the operation performed in the step S41 was the operation for movement of the head in the disk outer direction, the servo control device 6 changes the direction of the head movement to the disk inner direction (in a step S46). If the operation performed in the step S41 was the operation for movement of the head in the disk inner direction, the servo control device 6 changes the direction of the head movement to the disk outer direction (in the step S46). Then, the servo control device 6 performs the operations shown in FIGS. 5 and 6 (in the step S44). Then, the servo control device 6 determines (in the step S45) whether or not updating of the feedforward information for predetermined measuring positions has been finished. When it has been finished (Yes in the step S45), the servo control device 6 completes the feedforward updating operation shown in FIG. 9. When it has not been finished (No in the step S45), the servo control device 6 repeats the operations of the steps from the step 42 through the step 46 until updating of the feedforward information for the predetermined measuring positions has been finished (Yes in the step S45). In the repetition, the step S46 and the step S43 are alternately performed. Thus, updating of the feedforward information for the predetermined measuring positions for each head movement direction are performed.

When the operation is performed for each amount of head movement distance ('distance' in the step S42) and also the amount of head movement distance is changed (Yes in the step S47), the servo control device 6 changes the amount of head movement distance (in a step S48). Then, the servo control device 6 performs the operations of FIGS. 5 and 6 (in the step S44). Then, the servo control device 6 determines (in the step S45) whether or not updating of the feedforward information for predetermined amounts of head movement distance has been finished.

When it has been finished (Yes in the step S45), the servo control device 6 completes the feedforward updating operation shown in FIG. 9. When it has not been finished (No in the step S45), the servo control device 6 repeats the operations of the steps S42, S47, S48, S44 and S45 until updating of the feedforward information for the predetermined head movement distance amounts has been finished (Yes in the step S45).

When the operation is performed for each amount of head movement distance ('distance' in the step S42) and also the amount of head movement distance is not changed (No in the step S47), the servo control device 6 changes the measurement starting track (in a step S49). Then, the servo control device 6 performs the operations of FIGS. 5 and 6 (in the step S50). Then, the servo control device 6 repeats the steps from the step 49 through 51 until updating of the feedforward information for the predetermined measurement starting tracks has been finished (Yes in the step S51). Further, the servo control device 6 determines (in the step S45) whether or not updating of the feedforward information for predetermined amounts of head movement distance has been finished. If it is finished (Yes in the step S45), the servo control device 6 reads, from the feedforward table 9, the feedforward information for the respective measurement starting tracks for each amount of head movement distance and obtains the average thereof. Then, the servo control device 6 stores the averages in the feedforward table 9, and completes the feedforward updating operation shown in FIG. 9. If it is not finished (No in the step S45), the servo control device repeats the steps S42, from S47 through S51, S44 and S45 until updating of the feedforward information for the predetermined amounts of head movement distance has been finished (Yes in the step S45). In the repetition, the repetition of the steps from S49 through S51 and performing of the steps S42, S47, S48, S44 and S45 are alternately performed. Thus, updating of the feedforward information for the predetermined measurement starting tracks for each amount of head movement distance are performed.

By performing the operations shown in FIG. 9, the disk device obtains various feedforward information. Thereby, it is possible to perform accurate servo control.

Further, in actual reading and writing operations, when the feedforward information for an in-between value of the stored feedforward information is used for moving the head 15, accurate servo control can be performed as a result of obtaining the feedforward information for the in-between value by interpolation of the stored feedforward information.

The disk device, which has obtained the optimum feedforward information in the method shown in FIG. 9, then performs a sequence of updating the target information into information dedicated and optimum to the specific disk device.

In the sequence of obtaining the optimum target information, operations, similar to the operations, shown in FIG. 2, of the disk device performing the feedforward servo control in the related art, are performed. The servo control device sets the first switch 13 to be in the OFF state and the second switch 14 to be in the ON state.

The VCM 2 moves the head 15, in accordance with instructions of the servo control device 6, to the measurement starting track which corresponds to the initial value of the position measurement (in the step S101 of FIG. 7).

The servo control device 6 supplies an address to the feedforward table 9 so as to specify a parameter for moving the head 15. The parameters of the feedforward table 9 have been updated by the operations shown in FIGS. 5, 6 and 9. The servo control device 6 receives the parameter from the feedforward table 9 and sends the current value corresponding to the parameter to the adder 12. The adder 12 supplies the current to the power amplifier 3 which drives the VCM 2. As a result of being driven by the VCM 2, the head 15 starts seeking for the specified number of tracks (in the step S101).

The head 15 sends the position information from seeking start (in the step S102) to seeking end (in the step S104) in analog values to the position demodulating circuit 4. The position demodulating circuit 4, receiving the position information, converts the analog signal to the digital signal at each sampling position, and sends the demodulated position information to the demodulated information table 8. The information demodulated table 8 stores the information (in the step S103). The head 15 finishes the seeking (in the step S104), and then, enters the on-track condition (in the step S105).

Figure 7D:
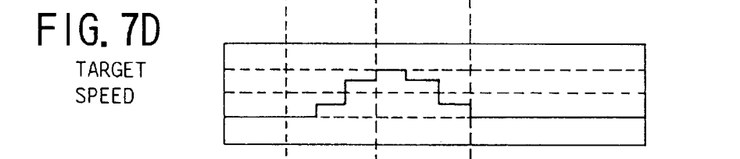

During the seeking, the comparator 11 obtains the difference between the demodulated speed information, which is stored in the demodulated information table 8 at any time, and the target speed information, which is previously stored in the target information table 7, for example, the target speed information such as that shown in FIG. 7D. Further, the comparator 11 obtains the difference between the demodulated position information, which is stored in the demodulated information table 8 at any time, and the target position information, which is previously stored in the target information table 7, for example, the target position information such as that shown in FIG. 7H. The comparator 11 sends the feedback error, for example, such as that shown in FIG. 7E, to the detection control device 10 at any time. The detection control device 10, receiving the feedback error, determines, based on a predetermined determination reference range, whether the feedback error is within the range (in the step S106). The feedback error shown in FIG. 7E corresponds to each feedback error between the demodulated speed information and the target speed information, and the feedback error between the demodulated position information and the target position information.

When the feedback error is within the predetermined range (Yes in the step S106), the detection control device 10 informs the servo control device 6 that the head 15 has moved to the target position. The servo control device 6 causes the first switch 13 to be in the ON state. The demodulated information table 8 transfers the stored demodulated position information to the target information table 7 which stores the transferred information. Then, the servo control device 6 causes the first switch 13 to be in the OFF state.

When the feedback error is out of the predetermined range (No in the step S106), the detection control device 10 informs the servo control device 6 that the head 15 has not moved to the target position. The VCM 2, in accordance with instructions of the servo control device 6, move the head 15 to the measurement starting track which corresponds to the initial value of the position measurement (in the step S107). The servo control device 6 supplies, to the feedforward table 9, an address, thus specifies a parameter for moving the head 15, reads the parameter from the feedforward table 9, and sends the current value corresponding to the parameter to the adder 12. The adder 12 adds the feedback error to the current value, and supplies the current as the addition result to the power amplifier 3. Thereby, the power amplifier 3 drives the VCM 2. The head 15 starts seeking for the specified number of tracks, as a result of being driven by the VCM 22.

The servo control circuit 1 repeats the above-described operations until the feedback error is within the predetermined range. When the feedback error is within the predetermined range, the servo control device 6 causes the first switch 13 to be in the ON state. The demodulated information table 8 transfers the stored demodulated position information to the target information table 7 which stores the transferred demodulated position information as the target position information. Thus, the updating of the target information table is finished.

In the sequence of updating the target information into information dedicated and optimum to the specific disk device, it is possible to replace the position information (the target position information, the demodulated position information) with the speed information (the target speed information, the demodulated speed information).

Further, in the demodulated information determination step in the updating of the target information, it is determined whether or not the feedback error is within the predetermined range, and the target information is updated to the optimum target information, in the embodiment. However, it is also possible that, for example, the detection control device 10 calculates the sum of the absolute values of the feedback errors, the feedback error is replaced with the sum of the absolute values of the feedback errors, and, based on the predetermined determination reference range, for example, such as that shown in FIG. 7E, it is determined whether or not the sum of the absolute values of the feedback errors is within the range. Thereby, the optimum target information can be obtained similarly.

Figure 7E:
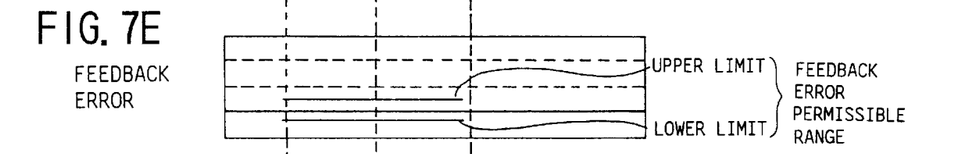
Figure 7F:
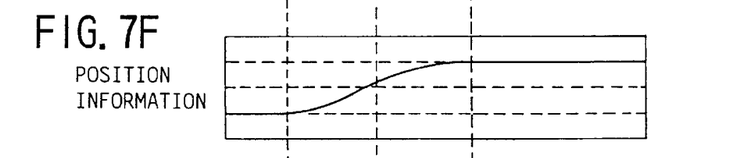
Figure 7G:
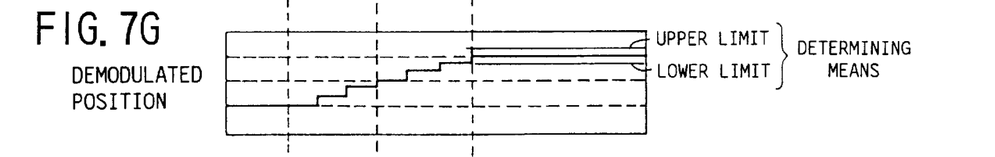
Figure 7H:
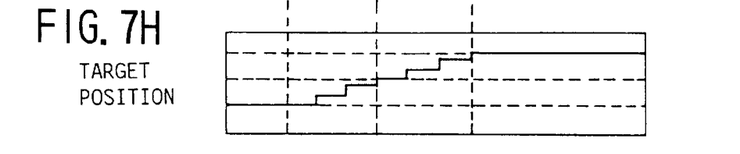

Further, in the demodulated information determination step in the updating of the target information, it is also possible that, for example, the detection control device 10 calculates the sum of squares of the feedback errors, the feedback errors are replaced with the sum of squares of the feedback errors, and, based on the predetermined determination reference range, for example, such as that shown in FIG. 7E, it is determined whether or not the sum of squares of the feedback errors is within the range. Thereby, the optimum target information can be obtained similarly.

Advantages/effects obtained as a result of calibrating the disk device as described above will now be described. In the disk device, in actual reading and writing operations, if the performances of respective components vary, because the feedforward information stored in the feedforward table 9 is always the latest information dedicated to the specific disk device, the head can be accurately moved only with the feedforward information, the delay due to the feedback loop is reduced and it is possible to achieve high-speed seeking. Further, if the determination reference range for determining whether the head has reached a target accurately becomes narrower as the track density increases, because the precise feedforward information can be obtained, stable servo control can be performed against externally applied shake or shock, or variation of performances of components among disk devices.

Further, in the disk device having the arrangement of the embodiment, more precise feedforward information and target information can be obtained as a result of performing feedforward information updating with repetition for optimizing the information with a narrower one of the determination reference range of the determining means 16.

In the components of the disk device, the performance of some components may change due to operating time and/or operating environment. As the performances of components change, the optimum value of the feedforward information changes. In order to have the latest information dedicated to the specific disk device, the disk device according to the present invention can update the feedforward information into the latest information dedicated and optimum to the specific disk device in at least one of the following occasions: before the disk device is shipped; when power is first supplied to the disk device after the shipment; when a seek error occurs; when the number of seek errors reaches a predetermined number of seek error occurrences; and periodic timing given by an internal clock of the disk device.

Accordingly, in the disk device according to the present invention, even if the performances of the respective components change, the feedforward information is always the latest information dedicated to the specific disk device.

Further, the present invention is not limited to the above-described embodiments, and variations and modifications may be made without departing from the scope of the present invention.

What is claimed is:

1. A disk device which performs feedforward servo control for moving a head to a target track, said device comprising:
a calibrating unit for updating feedforward information, for moving said head, into information dedicated to a specific disk device so that a feedback error, which includes an error regarding a speed and position of the head at a time of seeking, falls within a given range updated by said calibrating unit;
a feedforward information storing unit for storing the feedforward information updated by the calibrating unit.

2. The disk device according to claim 1, wherein said calibrating unit updates feedforward information, for moving said head, into information dedicated to the specific disk device in at least one occasion selected from the following occasions: before said disk device is shipped; when power is first supplied to said disk device after a shipment; when a seek error occurs; when a number of seek errors reaches a predetermined number of seek error occurrences; and periodic timing given by an internal clock of said disk device.

3. The disk device according to claim 1, wherein a determining unit is provided to determine if said head has reached a target position based on a predetermined determination reference range, when the feedforward information is updated.

4. The disk device according to claim 1, wherein updating of the feedforward information is performed for a plurality of positions along a radial direction of said disk, and rewriting of stored contents of said feedforward information storing unit is performed if necessary.

5. The disk device according to claim 1, wherein updating of the feedforward information is performed for each amount of head movement distance, and rewriting the stored contents of said feedforward information storing unit is performed if necessary.

6. The disk device according to claim 5, wherein said each amount of head movement distance is a discrete value and, when said head is moved for an in-between value of discrete values, the feedforward information for said in-between value is obtained as a result of interpolation of the feedforward information of the discrete values.

7. The disk device according to claim 1, wherein:
updating of target information including target speed information and target position information for moving said head to a target position is performed, after the updating of the feedforward information,
said disk device further comprises:
a demodulated information storing unit for storing demodulated information including demodulated speed information and demodulated position information obtained from demodulating feedback information from said head; and
a target information storing unit for storing the target information.

8. A disk device calibrating method, said disk device performing feedforward servo control for moving a head to a target track, said method comprising the steps of:

a) updating feedforward information, for moving said head, into information dedicated to a specific disk device so that a feedback error, which includes an error regarding a speed and position of the head at a time of seeking, falls within a given range; and b) storing the updated feedforward information in a feedforward information storing unit.

9. The disk device calibrating method according to claim 8, comprising the step of c) determining if said head has reached a target position based on a predetermined determination reference range, when the feedforward information is updated.

10. The disk device calibrating method according to claim 8, wherein updating of the feedforward information is performed for a plurality of positions along a radial direction of said disk, and rewriting of stored contents of said feedforward information storing unit is performed if necessary.

11. The disk device calibrating method according to claim 8, wherein updating of the feedforward information is performed for each amount of head movement distance, and rewriting of stored contents of said feedforward information storing unit is performed if necessary.

12. The disk device calibrating method according to claim 11, wherein said each amount of head movement distance is a discrete value and, when said head is moved for an in-between value of discrete values, the feedforward information for said in-between value is obtained as a result of interpolation of the feedforward information of the discrete values.

13. The disk device calibrating method according to claim 8, wherein updating of target information including target speed information and target position information for moving said head to a target position is performed, after the updating of the feedforward information.

14. A disk device which performs feedforward servo control for moving a head to a target track, said device comprising:

a calibrating unit for updating feedforward information, for moving said head, into information dedicated to a specific disk device so that a feedback error falls within a given range updated by said calibrating unit; and a feedforward information storing unit for storing the feedforward information updated by the calibrating unit;

wherein updating of the feedforward information is performed for a plurality of positions along a radial direction for each amount of head movement distance, and an average value of the feedforward information for each amount of head movement distance is stored in said feedforward information storing unit.

15. A disk device which performs feedforward servo control for moving a head to a target track, said device comprising:

a calibrating unit for updating feedforward information, for moving said head, into information dedicated to a specific disk device so that a feedback error falls within a given range updated by said calibrating unit; and a feedforward information storing unit for storing the feedforward information updated by the calibrating unit;

wherein updating of target information, including target speed information and target position information for moving said head to a target position, is performed after the updating of the feedforward information;

a demodulated information storing unit for storing demodulated information including demodulated speed information and demodulated position information obtained from demodulating feedback information from said head;

said demodulated information determining unit determining if said feedback error is within a predetermined determination reference range, said feedback error being obtained by comparing the demodulated information for a predetermined plurality of positions on a head moving path and the target information corresponding to said predetermined plurality of positions with one another; and a target information storing unit for storing the target information.

16. A disk device which performs feedforward servo control for moving a head to a target track, said device comprising:

a calibrating unit for updating feedforward information, for moving said head, into information dedicated to a specific disk device so that a feedback error falls within a given range updated by said calibrating unit; and a feedforward information storing unit for storing the feedforward information updated by the calibrating unit;

wherein updating of target information, including target speed information and target position information for moving said head to a target position, is performed after the updating of the feedforward information;

a demodulated information storing unit for storing demodulated information including demodulated speed information and demodulated position information obtained from demodulating feedback information from said head;

said demodulated information determining unit determining if the sum of absolute values of feedback errors is within a predetermined determination reference range, said feedback errors being obtained by comparing the demodulated information for a predetermined plurality of positions on a head moving path and the target information corresponding to said predetermined plurality of positions with one another; and a target information storing unit for storing the target information.

17. A disk device which performs feedforward servo control for moving a head to a target track, said device comprising:

a calibrating unit for updating feedforward information, for moving said head, into information dedicated to a specific disk device so that a feedback error falls within a given range updated by said calibrating unit; and a feedforward information storing unit for storing the feedforward information updated by the calibrating unit;

wherein updating of target information, including target speed information and target position information for moving said head to a target position, is performed after the updating of the feedforward information;

a demodulated information storing unit for storing demodulated information including demodulated speed information and demodulated position information obtained from demodulating feedback information from said head;

said demodulated information determining unit determining whether a sum of squares of feedback errors is within a predetermined determination reference range, said feedback errors being obtained by comparing the demodulated information for a predetermined plurality of positions on a head moving path and the target information corresponding to said predetermined plurality of positions with one another; and a target information storing unit for storing the target information.

18. A disk device calibrating method, said disk device performing feedforward servo control for moving a head to a target track, said method comprising the steps of:

a) updating feedforward information, for moving said head, into information dedicated to a specific disk device so that a feedback error falls within a given range;

b) storing the updated feedforward information in a feedforward information storing unit;

wherein updating of target information including target speed information and target position information for moving said head to a target position is performed, after the updating of the feedforward information; and c) determining whether feedback error is within a predetermined determination reference range, said feedback error being obtained by comparing the demodulated information for a predetermined plurality of positions on a head moving path and the target information corresponding to said predetermined plurality of positions with one another.

19. A disk device calibrating method, said disk device performing feedforward servo control for moving a head to a target track, said method comprising the steps of:

a) updating feedforward information, for moving said head, into information dedicated to a specific disk device so that a feedback error falls within a given range;

b) storing the updated feedforward information in a feedforward information storing unit;

wherein updating of target information including target speed information and target position information for moving said head to a target position is performed, after the updating of the feedforward information; and c) determining whether a sum of absolute values of feedback errors is within a predetermined determination reference range, said feedback errors being obtained from comparing the demodulated information for a predetermined plurality of positions on a head moving path and the target information corresponding to said predetermined plurality of positions with one another.

20. A disk device calibrating method, said disk device performing feedforward servo control for moving a head to a target track, said method comprising the steps of:

a) updating feedforward information, for moving said head, into information dedicated to a specific disk device so that a feedback error falls within a given range;

b) storing the updated feedforward information in a feedforward information storing unit;

wherein updating of target information including target speed information and target position information for moving said head to a target position is performed, after the updating of the feedforward information; and c) determining whether a sum of squares of feedback errors is within a predetermined determination reference range, said feedback errors being obtained from comparing the demodulated information for a predetermined plurality of positions on a head moving path and the target information corresponding to said predetermined plurality of positions with one another.

21. A disk device which performs feedforward servo control for moving a head to a target track, said device comprising:

a calibrating unit for updating feedforward information, for moving said head, into information dedicated to a specific disk device so that a feedback error falls within a given range updated by said calibrating unit;

a feedforward information storing unit for storing the feedforward information updated by the calibrating unit;

wherein updating of the feedforward information is performed for each of plural discrete amounts of head movement distance, and when said head is moved a selected distance between a given two of said plural discrete amounts of head movement distance, the feedforward information for said selected distance is obtained as a result of interpolation of the feedforward information of the two given discrete values.

22. A disk device calibrating method, said disk device performing feedforward servo control for moving a head to a target track, said method comprising the steps of:

a) updating feedforward information, for moving said head, into information dedicated to a specific disk device so that a feedback error falls within a given range; and b) storing the updated feedforward information in a feedforward information storing unit;

wherein updating of the feedforward information is performed for each of plural discrete amounts of head movement distance, and when said head is moved a selected distance between a given two of said plural discrete amounts of head movement distance, the feedforward information for said selected distance is obtained as a result of interpolation of the feedforward information of the two given discrete values.

23. The disk device calibrating method according to claim 22, wherein updating of the feedforward information is performed for a plurality of positions along a radial direction for each amount of head movement distance, and an average value of the feedforward information for each amount of head movement distance is stored in said feedforward information storing unit.

* * * * *